(12) United States Patent
Donovan et al.

(10) Patent No.: US 7,221,371 B2
(45) Date of Patent: May 22, 2007

(54) SHORTER FOOTPRINTS FOR ANISOTROPIC TEXTURE FILTERING

(75) Inventors: Walter E. Donovan, Saratoga, CA (US); Paul S. Heckbert, Pittsburgh, PA (US)

(73) Assignee: NVIDIA Corporation, Santa Clara, CA (US)

( * ) Notice: Subject to any disclaimer, the term of this patent is extended or adjusted under 35 U.S.C. 154(b) by 53 days.

(21) Appl. No.: 10/812,492

(22) Filed: Mar. 30, 2004

(65) Prior Publication Data

US 2005/0219256 A1 Oct. 6, 2005

(51) Int. Cl.
*G09G 5/00* (2006.01)
(52) U.S. Cl. ............... 345/582; 345/586; 345/585
(58) Field of Classification Search ........... 345/582, 345/586, 585
See application file for complete search history.

(56) References Cited

U.S. PATENT DOCUMENTS

| 6,040,837 A | 3/2000 | Wong et al. |
| 6,724,395 B1 | 4/2004 | Treichler |
| 2004/0119720 A1 | 6/2004 | Spangler |

OTHER PUBLICATIONS

McCormack, Joe, et al., "Feline: Fast Elliptical Lines for Anisotropic Texture Mapping," Mitsubishi Electric Information Technology Center America, 2000.
Greene, Ned, et al., "Creating Raster Omnimax Images from Multiple Perspective Views Using the Elliptical Weighted Average Filter," IEEE Computer Graphics and Applications, vol. 6, Issue 6, pp. 21-27, Jun. 1986.
Williams, Lance, "Pyramidal Parametrics," Computer Graphics, vol. 17, No. 3, Jul. 1983.
Heckbert, Paul S., "Fundamentals of Texture Mapping and Image Warping," *Master's Thesis*, Dept. of Electrical Engineering and Computer Science, University of California, Berkeley, CA, Jun. 17, 1989.
"ATI's Optimized Texture Filtering Called Into Question," Tom's Hardware Guide, Dec. 17, 2004. <http://www20.graphics.tomshardware.com/graphic/20040603/index.html>.
Heckbert, Paul, "Texture Mapping Polygons In Perspective," Computer Graphics Lab, New York Institute of Technology, Technical Memo No. 13, Apr. 28, 1983.
Barkans, Anthony C., "High Quality Rendering Using the Talisman Architecture", SIGGRAPH/Eurographics Workshop, 1997.
"Anisotropic Texture Filtering," Meltdown Feb. 1998, Prerelease, Direct3D Reference Rasterizer.
Talisman 3D Technology Briefing, Talisman Graphics & Multimedia System.
Matthias Zwicker et al., "EWA Splatting," *IEEE Transactions on Visualization and Computer Graphics*, IEEE Service Center, Jul. 2002 vol. 8(3): pp. 1-15.
Baoquan Chen et al., "Footprint Area Sampled Texturing," *IEEE Transactions on Visualization and Computer Graphics*, Mar./Apr. 2004 vol. 10(2): pp. 230-240.

*Primary Examiner*—Kee M. Tung
*Assistant Examiner*—Mike Rahmjoo
(74) *Attorney, Agent, or Firm*—Patterson & Sheridan LLP (57) ABSTRACT

Shortening a footprint is a technique to reduce the number of texture samples anisotropically filtered to determine a texture value associated with a graphics fragment. Reducing the number of texture samples anisotropically filtered reduces the number of texture samples read and simplifies the filter computation. Programmable knobs are used to shorten the footprint of a pixel in texture space thereby reducing the number of texture samples used during anisotropic filtering. These knobs permit a user to determine a balance between improved texture map performance and anisotropic texture filtering quality.

15 Claims, 7 Drawing Sheets

PRIOR ART

FIG. 1C

PRIOR ART

SHORTER FOOTPRINTS FOR ANISOTROPIC TEXTURE FILTERING

FIELD OF THE INVENTION

One or more aspects of the invention generally relate to computer graphics, and more particularly to filtering texture map data.

BACKGROUND

Figure 1A:
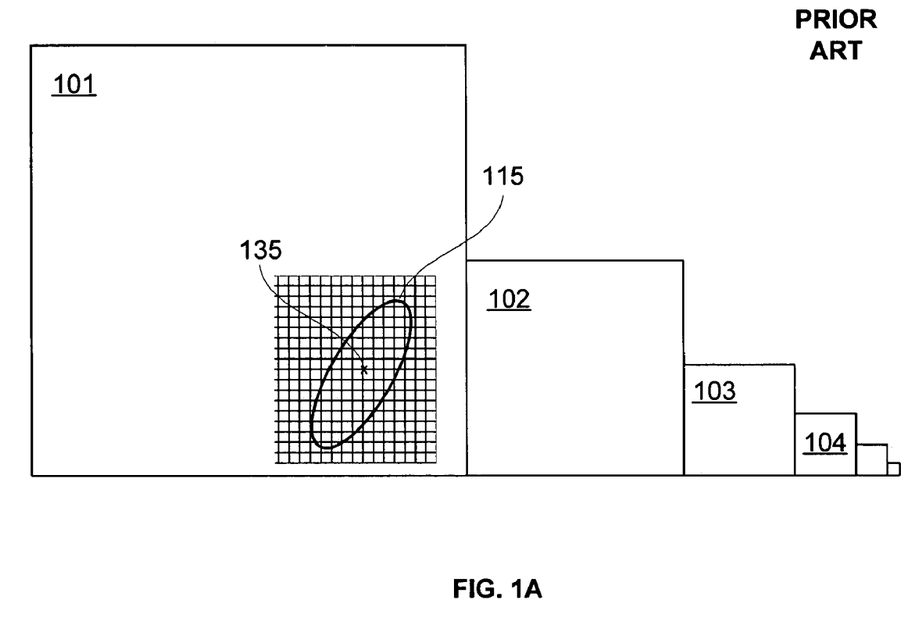
FIG. 1A is a conceptual diagram of prior art showing a mip mapped texture.

Conventional graphics processors are exemplified by systems and methods developed to read and filter texture map samples. To simplify the texture map filtering performed within a graphics processor, a texture is prefiltered and various resolutions of the prefiltered texture are stored as mip mapped texture maps. FIG. 1A is a conceptual diagram of prior art showing a mip mapped texture including a highest resolution texture map, Texture Map 101. A Texture Map 102, a Texture Map 103, and a Texture Map 104 are successively lower resolution texture maps, mip maps, each storing prefiltered texture samples.

Figure 1B:
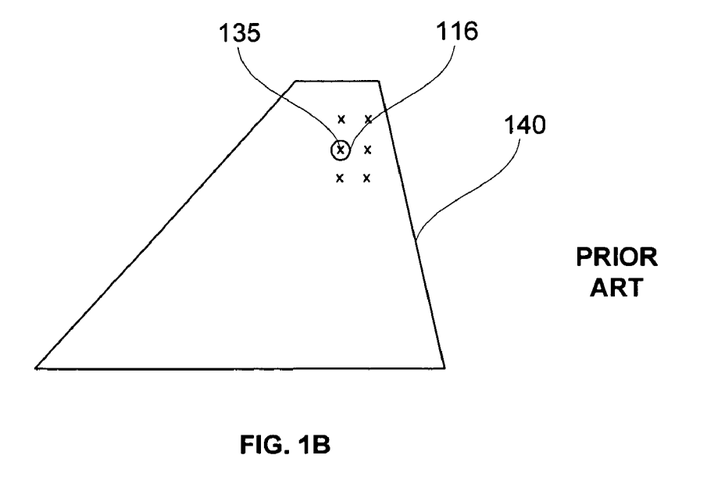
FIGS. 1B, 1C, and 1D illustrate a prior art application of texture samples to a surface.

Classic mip maps are isotropically filtered, i.e. filtered symmetrically in the horizontal and vertical directions using a square filter pattern. Isotropically filtered mip maps result in high quality images for surfaces with major and minor texture axes that are similar in length. However, when an isotropically filtered texture is applied to a receding surface viewed "on edge", aliasing artifacts (blurring) become apparent to a viewer as the texture is effectively "stretched" in one dimension, the receding direction, as the texture is applied to the surface. A Footprint 115 is a pixel footprint in texture space, with a Position 135 being the pixel center. FIG. 1B illustrates a prior art application of Texture Map 101 applied to pixels of a Surface 140 that is receding in image space. When viewed in image space, Footprint 115 (an ellipse) appears as Footprint 116 (a circle). While isotropic filtering of texture samples within a pixel footprint that forms a circle in texture space results in a high-quality image, isotropic filtering of texture samples within a pixel footprint that forms an ellipse, such as Footprint 115, results in an image with aliasing artifacts. In contrast to isotropic filtering, anisotropic filtering uses a rectangular shaped filter pattern, resulting in fewer aliasing artifacts for footprints with major and minor axes that are not similar in length in texture space.

Figure 1C:
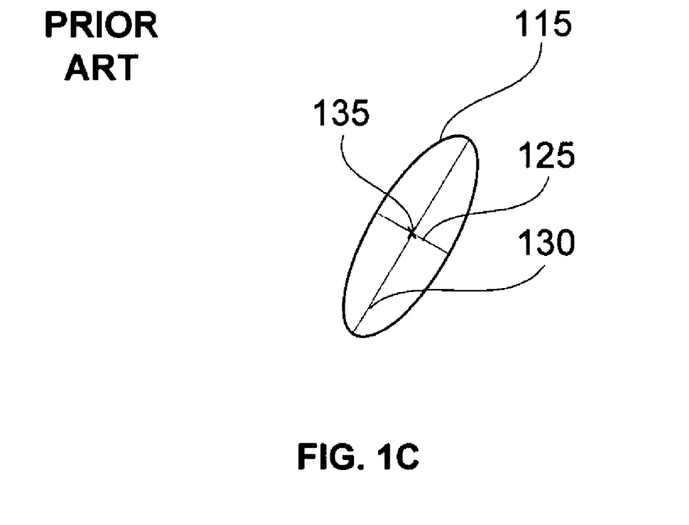
Figure 1D:
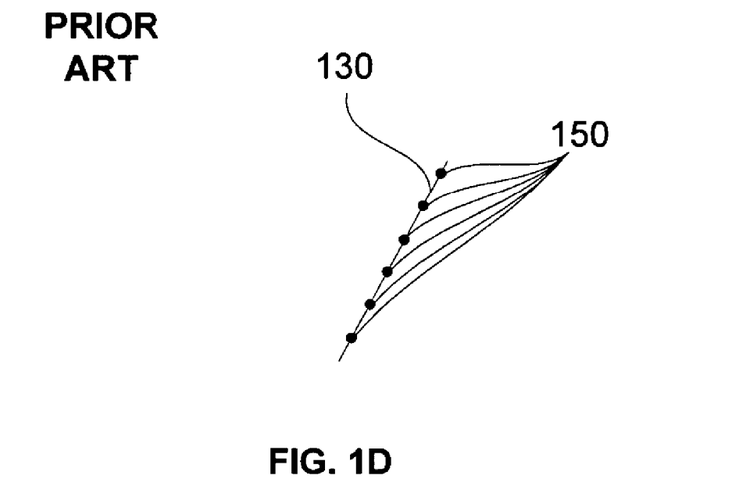

FIG. 1C illustrates Footprint 115 including a Minor Axis 125 that is significantly shorter than a Major Axis 130. FIG. 1D illustrates a prior art application of anisotropic filtering of Texture Samples 150 along Major Axis 130. Texture Samples 150 read from one or more mip maps are anisotropically filtered to produce a filtered texture sample. Classic anisotropic filtering filters 16 texture samples in a non-square pattern, compared with 8 texture samples isotropically filtered when trilinear interpolation is used or 4 texture samples isotropically filtered when bilinear interpolation is used to produce the filtered texture sample. Therefore, anisotropic filtering reads and processes twice as many texture samples as trilinear filtering.

In general, producing a higher-quality image, such as an image produced using anisotropic filtering, requires reading and processing more texture samples to produce each filtered texture sample. Therefore, texture sample filtering performance decreases as image quality improves, due to limited bandwidth available for reading texture samples stored in memory and limited computational resources within a graphics processor.

Accordingly, there is a need to balance performance of anisotropic texture sample filtering with image quality to minimize image quality degradation for a desired level of anisotropic texture sample filtering performance.

SUMMARY

The current invention involves new systems and methods for shortening a footprint to reduce the number of samples used during anisotropic filtering. Some anisotropic filtering is performed using fewer texture samples, thereby reducing the number of texture samples read and speeds up texture sample filtering computations. Programmable knob values are used to control the number of texture samples used during anisotropic filtering, permitting a user to determine a balance between improved texture map performance and texture filtering quality.

Various embodiments of a method of the invention for reducing a number of texture samples used for anisotropic texture map filtering include receiving a logratio value, modifying the logratio value to produce a first-modified logratio value, and determining a first number of texture samples to filter based on the first-modified logratio value.

Various embodiments of a method of the invention for shortening a footprint of a pixel in texture space include receiving a major axis length for the footprint, receiving a minor axis length for the footprint, computing a logratio value using the major axis length and the minor axis length, and modifying the logratio value based on a programmable value of a knob to produce a modified logratio corresponding to a shortened footprint.

Various embodiments of the invention include an anisotropic unit for determining a number of texture samples to anisotropically filter. The anisotropic unit includes a logratio computation unit configured to obtain a major axis length and a minor axis length and produce a logratio value and a logratio modification unit configured to receive the logratio value and modify the logratio value to produce a first-modified logratio value.

Various embodiments of the invention include a programmable graphics processor for generating images using anisotropically filtered texture samples.

BRIEF DESCRIPTION OF THE VARIOUS VIEWS OF THE DRAWINGS

Accompanying drawing(s) show exemplary embodiment(s) in accordance with one or more aspects of the present invention; however, the accompanying drawing(s) should not be taken to limit the present invention to the embodiment(s) shown, but are for explanation and understanding only.

DISCLOSURE OF THE INVENTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

In conventional graphics processors a ratio value representing the ratio of the length of the minor axis to the length of the major axis, e.g. minor axis/major axis, is computed using a technique known to those skilled in the art. The length of the minor axis is used to determine the fine texture map level of detail (LOD) corresponding to the highest resolution mip map needed to compute a filtered texture sample. The ratio value, i.e., anisotropy, is used to determine a number of texture samples to read and process during anisotropic filtering to produce the filtered texture sample. The major axis and minor axis define a footprint that represents the projection of the pixel onto the texture map. Programmable "knob" values may be used to shorten the footprint along the major axis, thereby reducing the number of texture samples read and processed during anisotropic filtering.

A user may program one or more of the knob values, balancing improved performance (clock cycles or memory bandwidth) against image quality. In an alternate embodiment a driver may program the knob values based on a user performance mode selection, e.g., fastest, compromise, high quality, and the like. For example, a user may select a performance mode using a user interface using a pulldown menu, positioning a slider bar corresponding to each knob, or the like. Furthermore, the knob values may be predetermined or programmed for each texture, i.e. associated with a texture identifier (ID). The knob values may also be used to control anisotropic filtering of cubemaps (used for cubic environment mapping), one-dimensional textures, two-dimensional textures, or three-dimensional textures, or other mip mapped textures.

In an embodiment of the present invention, three knob values are used to effect the number of samples filtered to produce an anisotropically filtered texture value. A first knob reduces the number of samples used based on the weight applied to each sample during filtering. Specifically, samples which contribute to a lesser extent may be omitted from the computation, so they are not read from memory or processed. A second knob reduces the number of samples used from the coarse LOD texture map. Fewer samples from the coarse LOD texture map may be used without introducing serious visual artifacts because the major axis and the minor axis are each twice as long in the coarse LOD texture map as they are in the fine LOD texture map. Therefore, some of the samples in the coarse LOD texture map may lie outside of the footprint in the coarse LOD texture map. Finally, a third knob reduces the number of samples by applying a bias to the number of sample computation. The third knob may be used to reduce the number of samples when bilinear or trilinear anisotropic filtering is used whereas the first and second knobs apply when trilinear anisotropic filtering is used.

Figure 2:
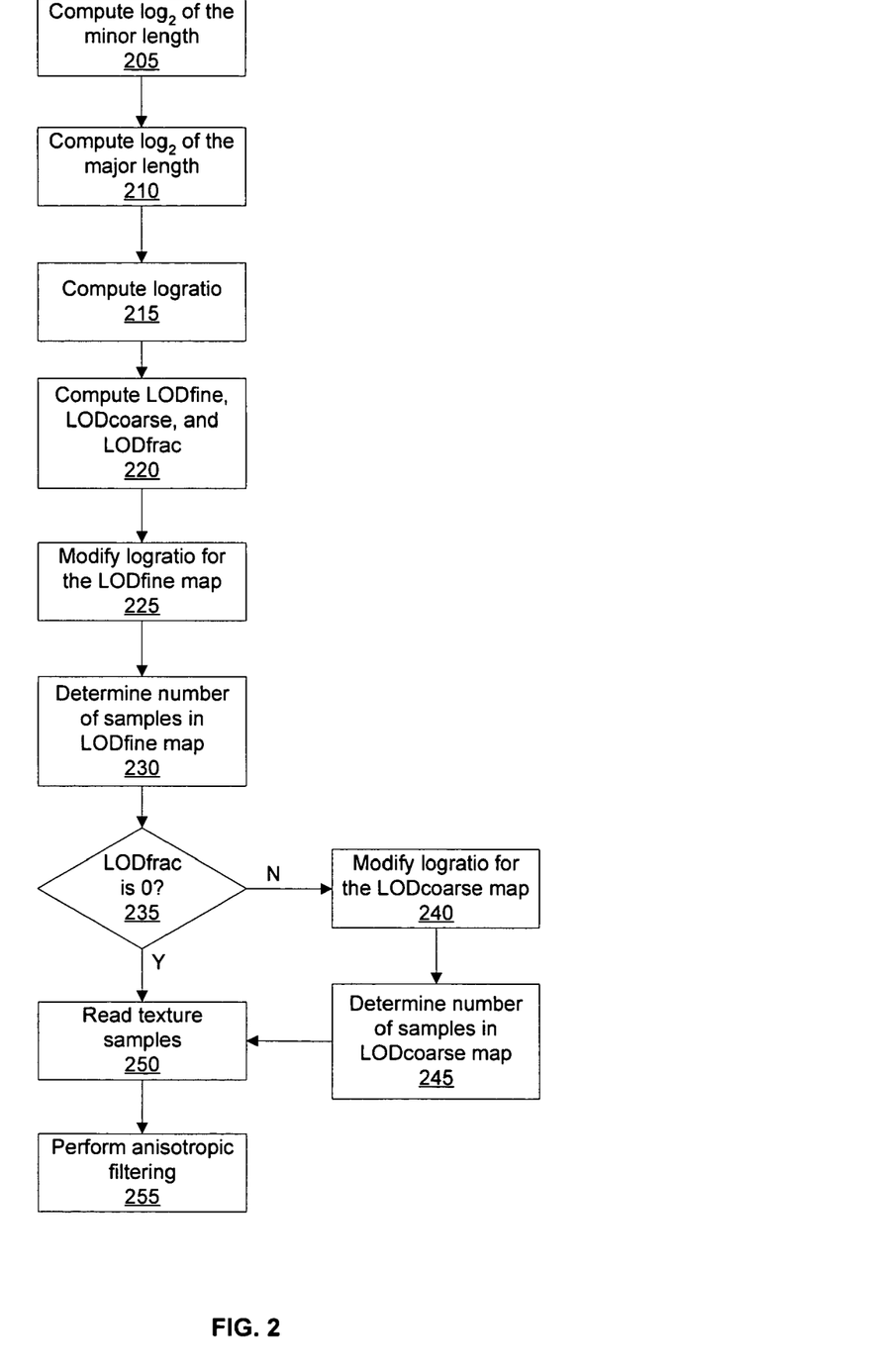
FIG. 2 illustrates an embodiment of a method of determining a number of texture samples for use in an anisotropic texture map filtering computation in accordance with one or more aspects of the present invention.

FIG. 2 illustrates an embodiment of a method of determining a number of texture samples for use in an anisotropic texture map filtering computation in accordance with one or more aspects of the present invention. In step 205 the base-two logarithm (log) of the minor axis length is computed to produce a logminor value. In step 210 the base-two log of the major axis length is computed to produce a logmajor value. In step 215 a logratio value is computed by subtracting the logmajor value from the logminor value. The logratio value is equivalent to the base-two log of the ratio value. In embodiments supporting a maximum anisotropy of $\frac{1}{16}$, the logratio value ranges from −4 to 0, where a logratio value of 0 indicates an isotropic footprint. Increasing the logratio value decreases the number of samples averaged over a range of logratios. The amount of processing needed to compute an anisotropically filtered texture value is proportional to the number of samples needed. Furthermore, performing computations in log space simplifies the computations and may be more efficient; for example, subtraction in log space is used instead of division. Likewise, addition is used instead of multiplication.

In step 220 the fine texture map LOD, LODfine, is set to the integer portion of logminor. Alternatively, LODfine is computed by summing the logmajor value and the logratio value to obtain the integer portion of logminor. In an alternate embodiment, in step 215, an anisotropic bias or offset value is applied to the logratio value computed in step 215 to produce a biased logratio value which replaces the logratio value. The anisotropic bias value increases the logratio value, resulting in selection of a lower resolution mip map. In the alternate embodiment, LODfine is computed by summing the logmajor value and the biased logratio value. The fractional portion of logminor is LODfrac or alternatively, the fractional portion of the sum of the logmajor value and the logratio value is LODfrac. The coarse texture map LOD, LODcoarse, is set to LODfine incremented by one.

Figure 3A:
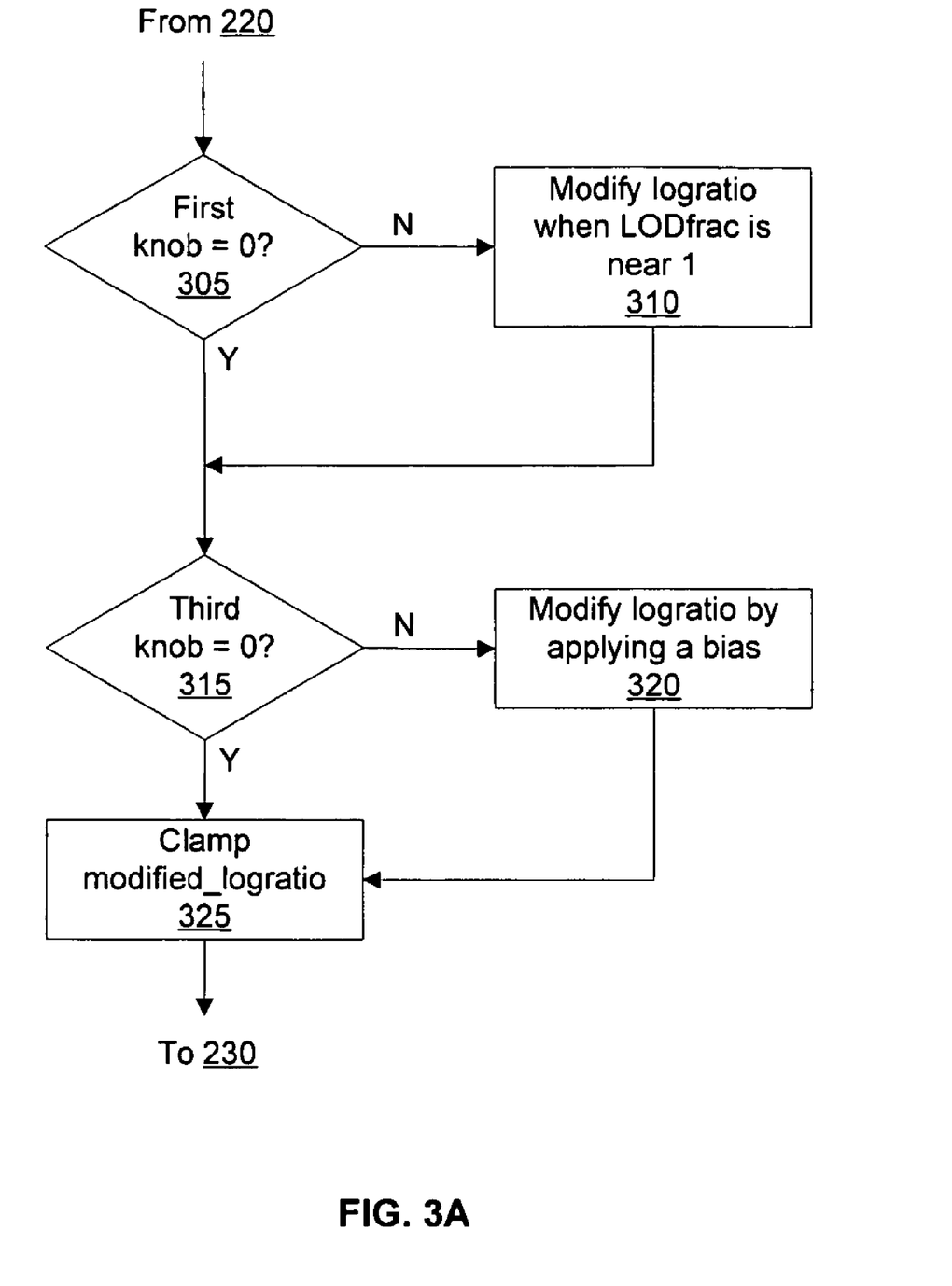
FIG. 3A illustrates an embodiment of a method of modifying a logratio value used to determine a number of samples to read from a fine resolution texture map for use in an anisotropic texture map filtering computation in accordance with one or more aspects of the present invention.

In step 225 the logratio value is modified to produce a first-modified logratio value based on one or more of the knob values, as described further herein in conjunction with FIG. 3A, potentially shortening the footprint. In step 230 a first number of texture samples based on the first-modified logratio value is determined. In one embodiment, a first ratio is computed:

$$\text{first ratio} = 2^{(first\text{-}modified\ logratio)}.$$

The first number of texture samples is computed using the first ratio. When the first ratio is 1 or more, the first number of texture samples is 1. Otherwise, the following equation is used:

$$\text{first number of texture samples} = 2 * \text{ceil}(0.5/(\text{first ratio})).$$

Alternatively, a different equation based on the first ratio is used to determine the first number of texture samples.

In step 235, if LODfrac is not equal to zero, then, steps 240 and 245 are completed. Otherwise, step 250 is completed following step 235. In step 240 the logratio value is modified to produce a second-modified logratio value based on the knob values, as described further herein in conjunction with FIG. 3A, potentially shortening the footprint. In step 245 a second number of texture samples based on the second-modified logratio value is determined. In one embodiment, a second ratio is computed:

second ratio=$2^{(second\text{-}modified\ logratio)}$.

The second number of texture samples is computed using the second ratio. When the second ratio is equal to or greater than 1, the second number of texture samples is 1. Otherwise, the following equation is used:

second number of texture samples=2*ceil(0.5/(second ratio)).

Alternatively, a different equation based on the second ratio is used to determine the second number of texture samples.

In step 250 the first number of texture samples in the mip map specified by LODfine are read from memory. In step 250, when LODfrac does not equal zero, the second number of texture samples in the mip map specified by LODcoarse are also read from memory. In step 255 texture samples read from memory in step 250 are anisotropically filtered to produce a filtered texture sample.

FIG. 3A illustrates an embodiment of a method of completing step 220 in FIG. 2 to modify the logratio value to produce the first-modified logratio value in accordance with one or more aspects of the present invention. In step 305 logratio, LODfine, LODcoarse, and LODfrac are received and the logratio value is copied to the first-modified logratio value. If, in step 305 the value of the first knob is not zero, step 310 is completed. Otherwise, the method proceeds to step 315. In step 310 the first-modified logratio value is modified when LODfrac is near one to reduce the first number of texture samples, i.e. the texture samples read from the texture map corresponding to LODfine. In some embodiments the first-modified logratio value is modified by increasing the first-modified logratio value when LODfrac is near one. In one embodiment, the first knob value may be set to one of three different values permitting a user or application to control at least one threshold. When the difference between one and the LODfrac is less-than or equal to at least one of the thresholds, the first-modified logratio value is modified, effectively shortening the footprint. The footprint may be shortened by increasing amounts dependent on whether or not the difference between one and the LODfrac is less-than or equal to one or two thresholds.

In an embodiment, steps 305 and 310 are completed to compute the first-modified logratio value using the code shown in Table 1, where lodf is the LODfrac, knob1 is the value of the first knob, modified_logratio1 is the first modified logratio, TEX_ONE is 0×100 (1.0 in 0.8), and TEX_S-CALE is 8. By way of illustration, the code is defined using C. However, any other language may be used to define the code.

TABLE 1

```
t = TEX_ONE - ToInt(LODfrac);
if (ToInt(knob1) != 0)
    modified_logratio1 = logratio+ MAX(0, log2table(t >> 2) -
    (ToInt(knob1)
    << TEX_SCALE));
else
    modified_logratio1 = logratio;
```

A function to generate the contents of an embodiment of log2table is shown in Table 2. According to the code shown in Table 1, the first-modified logratio value is computed using LODfrac to read log2table. By way of illustration, the function is defined using C. However, any other language may be used to define the function.

TABLE 2

```
// for x in 0..256 return -log2 ( MAX (1/64, (x>>2)/64.0) )
static int minuslog2[ ]= {
1536,1536,1280,1130,1024,942,874,817,768,724,686,650,618,589,561,
536,512,490,468,449,430,412,394,378,362,347,333,319,305,292,280,
268,256,245,234,223,212,202,193,183,174,164,156,147,138,130,122,114,
106,99,91,84,77,70,63,56,49,43,36,30,24,18,12,6,0,
};
// return -log2(arg) where arg is in [0, 63/64], scaled by TEX_SCALE
static int
log2table(int arg)
{
        assert (arg >= 0 && arg <= 64);
        return minuslog2[arg];
}
```

If, in step 315 the value of a third knob is not zero, step 320 is completed. Otherwise, the method proceeds to step 325. In step 320 the first-modified logratio value is further modified based on the value of the third knob to reduce the first number of samples. In one embodiment, a programmable bias value is added to the first-modified logratio value. For example, sixteen bias values may be stored in a programmable table that is read using the value of the third knob as an index.

In an embodiment, step 320 is completed to compute the first-modified logratio value using the following equation:

modified_logratio1=modified_logratio1+knob3table (knob3).

A function to generate the contents of an embodiment of knob3table is shown in Table 3. By way of illustration, the function is defined using C. However, any other language may be used to define the function.

TABLE 3

```
// return 16 different tweak values for logratio. 0 index must return 0.
static int
knob3table(int arg)
{
        assert (arg >= 0 && arg <= 15);
        return ((arg << 8) / 32);       // return [0, 15/32] scaled
by TEX_SCALE
}
```

In step 325 the first-modified logratio value is clamped to a value between -1024 and zero when a maximum of 16 samples are used for anisotropic filtering. Alternatively, the first-modified logratio is clamped to another value based on a different maximum number of samples supported for anisotropic filtering.

Figure 3B:
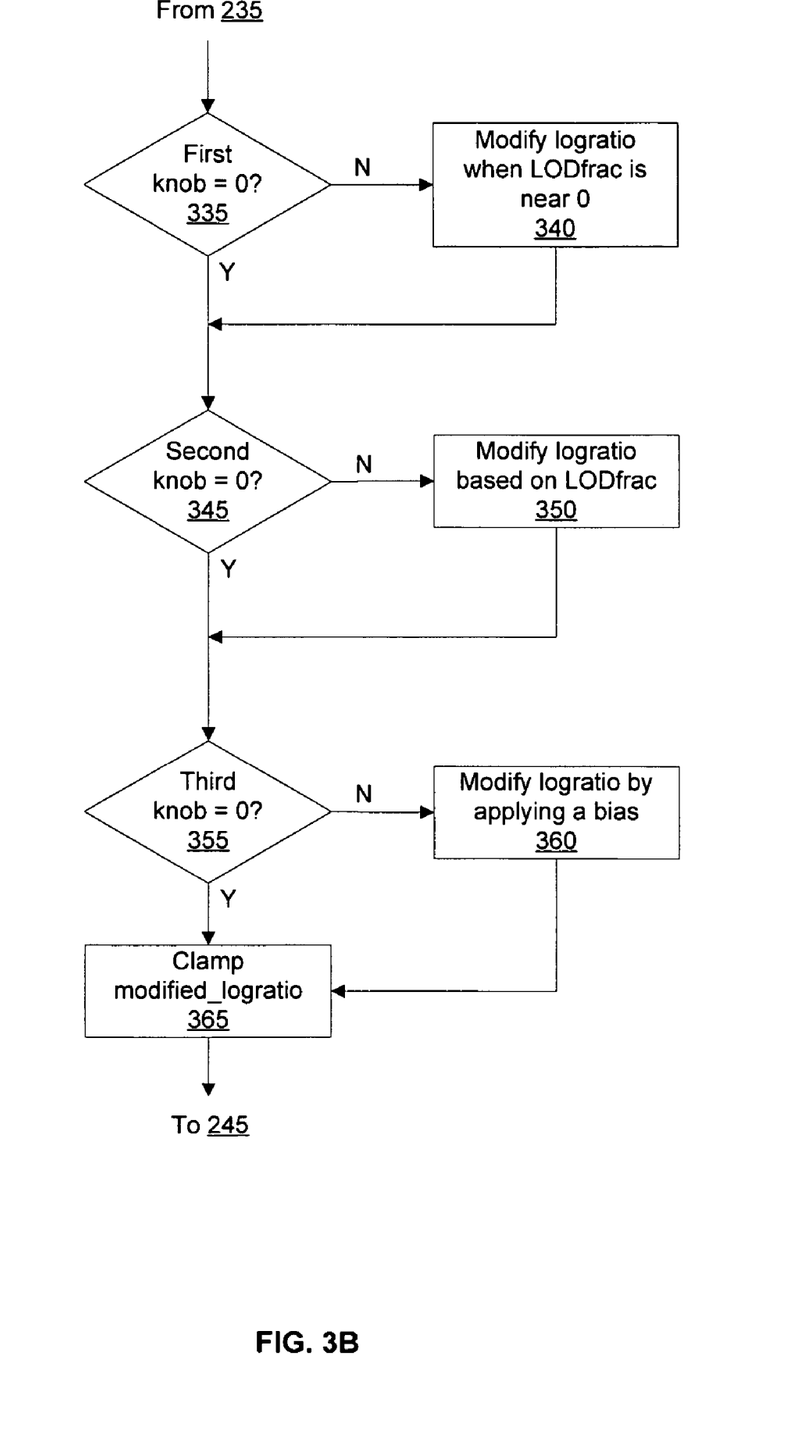
FIG. 3B illustrates an embodiment of a method of modifying a logratio value used to determine a number of samples to read from a coarse resolution texture map for use in an anisotropic texture map filtering computation in accordance with one or more aspects of the present invention.

FIG. 3B illustrates an embodiment of a method of completing step 240 in FIG. 2 to modify the logratio value to produce the second-modified logratio value in accordance with one or more aspects of the present invention. In step 335 logratio, LODfine, LODcoarse, and LODfrac are received and the logratio value is copied to the second-modified logratio value. If, in step 335 the value of a first knob is not zero, then step 340 is completed. Otherwise, the method proceeds to step 345. In step 340 the second-modified logratio value is modified when LODfrac is "near zero". Specifically, the second-modified logratio value is modified when LODfrac is within at least one of the thresholds specified by the value of the first knob to reduce the second number of texture samples, i.e., the texture samples read from the texture map corresponding to LODcoarse.

When LODfrac is less-than or equal to the threshold specified by the value of the first knob, the second-modified logratio value is modified.

In an embodiment, steps 335 and 340 are completed to compute the second-modified logratio value using the code shown in Table 4, where lodf is the LODfrac, knob1 is the value of the first knob, modified2_logratio1 is the second modified logratio, TEX_ONE is 0×100 (1.0 in 0.8), and TEX_SCALE is 8. The contents of an embodiment of log1table are shown in Table 2. By way of illustration, the code is defined using C. However, any other language may be used to define the code.

TABLE 4

```
t = ToInt(LODfrac);
if (ToInt(knob1) != 0)
    modified2_logratio1 = logratio+ MAX(0, log2table(t >> 2) -
    (ToInt(knob1) << TEX_SCALE));
else
    modified2_logratio1 = logratio;
```

If, in step 345 the value of the second knob is not zero, step 350 is completed. Otherwise, the method proceeds to step 355. In step 350 a third-modified logratio value is computed based on the value of the second knob to reduce the second number of texture samples read from the texture map corresponding to LODcoarse. In one embodiment, the logratio value is copied to the third-modified logratio value and the value of the second knob modifies the third-modified logratio value based on LODfrac. For example, the difference between one and LODfrac is added to the third-modified logratio value. The second-modified value is set to the value of the third-modified logratio value when the third-modified logratio value is greater-than the second-modified value.

In an embodiment, steps 345 and 350 are completed to compute the second-modified logratio value using the code shown in Table 4, where lodf is the LODfrac, knob2 is the value of the second knob, modified2_logratio1 is the second-modified logratio, and modified3_logratio1 is the third-modified logratio. By way of illustration, the code is defined using C. However, any other language may be used to define the code.

TABLE 5

```
if (ToInt(knob2) != 0)
    modified3_logratio1 = logratio+ (TEX_ONE - Toint(LODfrac));
else
    modified3_logratio1 = logratio;
modified2_logratio1 = MAX(modified3_logratio1,
modified2_logratio1);
```

If, in step 355 the value of the third knob is not zero, step 360 is completed. Otherwise, the method proceeds to step 365. In step 360 the second-modified logratio value is further modified based on the value of the third knob to reduce the second number of texture samples. In one embodiment, a programmable bias value is added to the second-modified logratio value. For example, sixteen bias values may be stored in a programmable table that is read using the third knob value.

In an embodiment, step 360 is completed to compute the second-modified logratio value using the following equation:

modified2_logratio1=modified2_logratio1+ knob3table(knob3), where the contents of knob3table are shown in Table 3.

In step 365 the second-modified logratio value is clamped to a value between −1024 and zero when a maximum of 16 samples are used for anisotropic filtering, to produce the first-modified logratio value. Alternatively, the second-modified logratio value is clamped to another value based on a different maximum number of texture samples supported for anisotropic filtering.

Figure 4:
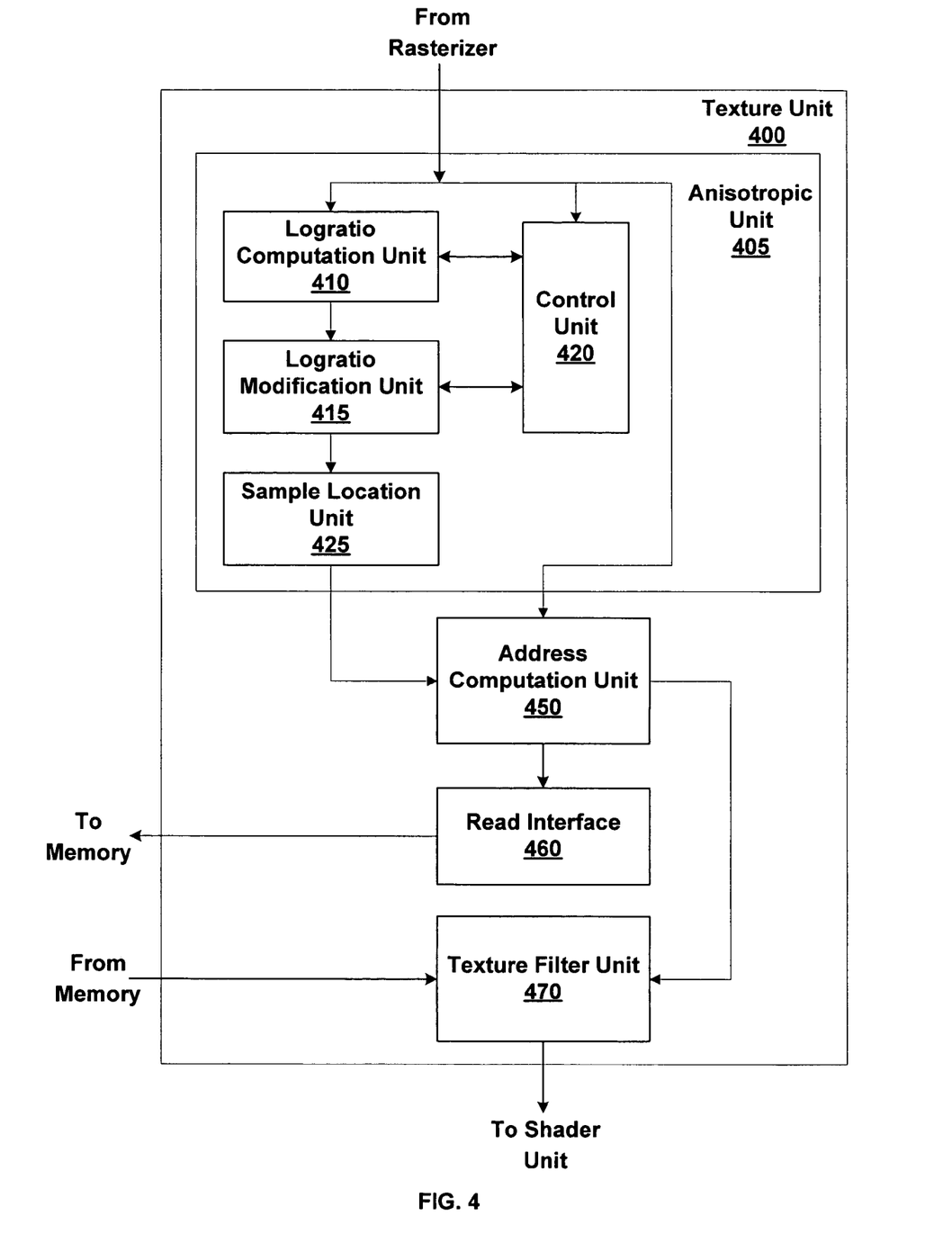
FIG. 4 is a block diagram of a portion of a shader unit including a texture unit in accordance with one or more aspects of the present invention.
Figure 5:
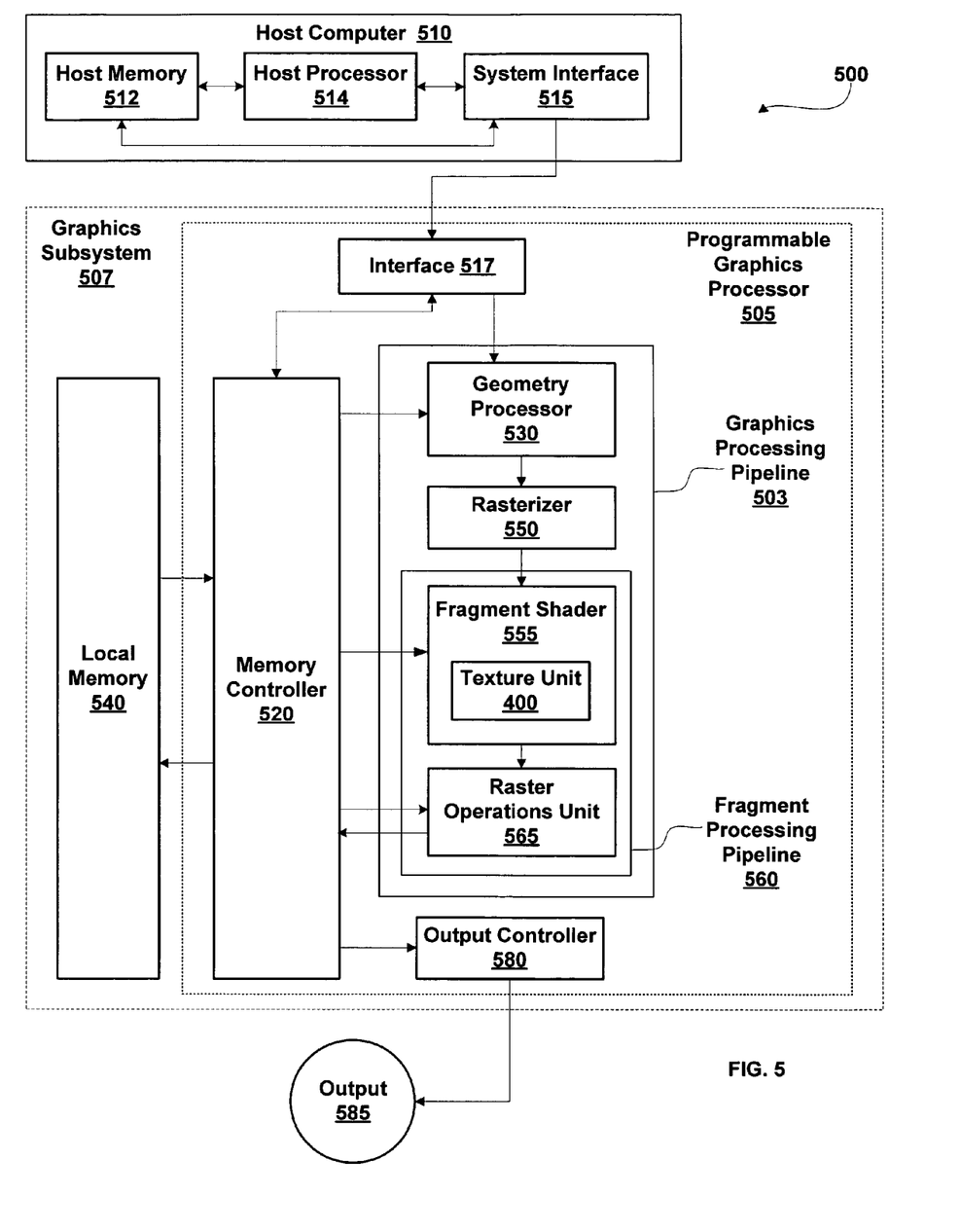
FIG. 5 is a block diagram of an exemplary embodiment of a respective computer system in accordance with one or more aspects of the present invention including a host computer and a graphics subsystem.

FIG. 4 is a block diagram of a portion of a graphics processing pipeline, to be described further herein in conjunction with FIG. 5. The graphics processing pipeline includes a Texture Unit 400 in accordance with one or more aspects of the present invention. In some embodiments, Texture Unit 400 receives data from a rasterizer, e.g., program instructions, and parameters associated with fragments (texture IDs, texture coordinates such as s and t, and the like). A fragment is formed by the intersection of a pixel and a primitive. Primitives include geometry, such as points, lines, triangles, quadrilaterals, meshes, surfaces, and the like. A fragment may cover a pixel or a portion of a pixel. Likewise, a pixel may include one or more fragments. In an embodiment, Texture Unit 400 receives minor axis lengths and the major axis lengths from the rasterizer. In another embodiment, Texture Unit 400 computes the minor axis length and the major axis length using parameters received from the rasterizer, e.g., texture coordinates, texture coordinate gradients, or the like.

Texture Unit 400 includes an Anisotropic Unit 405. A Control Unit 420 within Anisotropic Unit 405 processes the program instructions, such as instructions to load one or more programmable knob values, e.g., the first knob value, the second knob value, the third knob value, or the like, into a Logratio Modification Unit 415. Logratio Modification Unit 415 includes storage elements, e.g., registers, to store the one or more knob values.

Parameters produced by the rasterizer are received by a Logratio Computation Unit 410 within Anisotropic Unit 405. Logratio Computation Unit 410 computes the logratio value as previously described in conjunction with FIG. 2. The logratio value is output by Logratio Computation Unit 410 to Logratio Modification Unit 415. Logratio Modification Unit 415 modifies the logratio value to produce the first-modified logratio value and when LODfrac is not equal to zero, Logratio Modification Unit 415 also modifies the logratio value to produce the second-modified logratio value. The operations performed by Logratio Modification Unit 415 serve to reduce the number of texture samples read and filtered to produce the filtered texture sample.

A Sample Location Unit 425 receives the first-modified logratio value from Logratio Modification Unit 415. Sample Location Unit 425 also receives the second-modified logratio value from Logratio Modification Unit 415 when LODfrac is not equal to zero. Sample Location Unit 425 determines the first number of texture samples to be read from the mip map specified by LODfine. Sample Location Unit 425 determines the second number of texture samples to be read from the mip map specified by LODcoarse. Sample Location Unit 425 also determines the locations, e.g., texture coordinates, of the second number of texture samples and the locations of the first number of texture samples. Sample Location Unit 425 also computes weights, using techniques known to those skilled in the art, for use during filtering of the texture samples read from the mip map specified by LODfine and the mip map specified by LODcoarse.

Sample Location Unit 425 outputs sample locations, weights, LODfine, and LODcoarse to an Address Computation Unit 450. Address Computation Unit 450 uses texture parameters (texture ID, and the like) received by Texture Unit 400 to determine addresses for reading texture samples (the first number of texture samples or the first and the second number of texture samples) from memory. Address Computation Unit 450 outputs the addresses to a Read Interface 460. Read Interface 460 outputs the addresses and a read request to a memory, e.g., cache, RAM, ROM, or the like. Texture samples read from memory are received from the memory by a Texture Filter Unit 470. Texture Filter Unit 470 receives the weights from Address Computation Unit 450 and filters the texture samples read from memory using bilinear interpolation, trilinear interpolation, or anisotropic filtering to produce filtered texture samples. The filtered texture samples are output to a shader unit, described further herein, to compute a color for each fragment.

FIG. 5 is a block diagram of an exemplary embodiment of a Computing System generally designated 500 and including a Host Computer 510 and a Graphics Subsystem 507 including an embodiment of Texture Unit 400. Computing System 500 may be a desktop computer, server, laptop computer, palm-sized computer, tablet computer, game console, portable wireless terminal such as a PDA or cellular telephone, computer based simulator, or the like. Host computer 510 includes Host Processor 514 that may include a system memory controller to interface directly to Host Memory 512 or may communicate with Host Memory 512 through a System Interface 515. System Interface 515 may be an I/O (input/output) interface or a bridge device including the system memory controller to interface directly to Host Memory 512. An example of System Interface 515 known in the art includes Intel® Northbridge.

Host computer 510 communicates with Graphics Subsystem 507 via System Interface 515 and an Interface 517. Graphics Subsystem 507 includes a Local Memory 540 and a Programmable Graphics Processor 505. Programmable Graphics Processor 505 uses memory to store graphics data, including texture maps, and program instructions, where graphics data is any data that is input to or output from computation units within Programmable Graphics Processor 505. Graphics memory is any memory used to store graphics data or program instructions to be executed by Programmable Graphics Processor 505. Graphics memory can include portions of Host Memory 512, Local Memory 540 directly coupled to Programmable Graphics Processor 505, storage resources coupled to the computation units within Programmable Graphics Processor 505, and the like. Storage resources can include register files, caches, FIFOs (first in first out memories), and the like.

In addition to Interface 517, Programmable Graphics Processor 505 includes a Graphics Processing Pipeline 503, a Memory Controller 520 and an Output Controller 580. Data and program instructions received at Interface 517 can be passed to a Geometry Processor 530 within Graphics Processing Pipeline 503 or written to Local Memory 540 through Memory Controller 520. In addition to communicating with Local Memory 540, and Interface 517, Memory Controller 520 also communicates with Graphics Processing Pipeline 503 and Output Controller 580 through read and write interfaces in Graphics Processing Pipeline 503 and a read interface in Output Controller 580.

Within Graphics Processing Pipeline 503, Geometry Processor 530 and a programmable graphics fragment processing pipeline, Fragment Processing Pipeline 560, perform a variety of computational functions. Some of these functions are table lookup, scalar and vector addition, multiplication, division, coordinate-system mapping, calculation of vector normals, tessellation, calculation of derivatives, interpolation, and the like. Geometry Processor 530 and Fragment Processing Pipeline 560 are optionally configured such that data processing operations are performed in multiple passes through Graphics Processing Pipeline 503 or in multiple passes through Fragment Processing Pipeline 560. Each pass through Programmable Graphics Processor 505, Graphics Processing Pipeline 503 or Fragment Processing Pipeline 560 concludes with optional processing by a Raster Operations Unit 565.

Vertex programs are sequences of vertex program instructions compiled by Host Processor 514 for execution within Geometry Processor 530 and Rasterizer 550. Shader programs are sequences of shader program instructions compiled by Host Processor 514 for execution within Fragment Processing Pipeline 560. Geometry Processor 530 receives a stream of program instructions (vertex program instructions and shader program instructions) and data from Interface 517 or Memory Controller 520, and performs vector floating-point operations or other processing operations using the data. The program instructions configure subunits within Geometry Processor 530, Rasterizer 550 and Fragment Processing Pipeline 560. The program instructions and data are stored in graphics memory, e.g., portions of Host Memory 512, Local Memory 540, or storage resources within Programmable Graphics Processor 505. When a portion of Host Memory 512 is used to store program instructions and data the portion of Host Memory 512 can be uncached so as to increase performance of access by Programmable Graphics Processor 505. Alternatively, configuration information is written to registers within Geometry Processor 530, Rasterizer 550 and Fragment Processing Pipeline 560 using program instructions, encoded with the data, or the like.

Data processed by Geometry Processor 530 and program instructions are passed from Geometry Processor 530 to a Rasterizer 550. Rasterizer 550 is a sampling unit that processes primitives and generates sub-primitive data, such as fragment data, including parameters associated with fragments (texture IDs, texture coordinates, and the like). Rasterizer 550 converts the primitives into sub-primitive data by performing scan conversion on the data processed by Geometry Processor 530. Rasterizer 550 outputs fragment data and shader program instructions to Fragment Processing Pipeline 560.

The shader programs configure the Fragment Processing Pipeline 560 to process fragment data by specifying computations and computation precision. Fragment Shader 555 is optionally configured by shader program instructions such that fragment data processing operations are performed in multiple passes within Fragment Shader 555. Fragment Shader 555 includes an embodiment of previously described Texture Unit 400. In one embodiment Texture Unit 400 is configured to read shader program instructions stored in Local Memory 540 or Host Memory 512 via Memory Controller 520.

In some embodiments of Computing System 500 graphics processing performance is limited by memory bandwidth, e.g. between Host Memory 512 and Programmable Graphics Processor 505, between Local Memory 540 and Graphics Processing Pipeline 503, and the like. In those embodiments modifying the logratio value to reduce the number of texture samples read from Local Memory 540 or Host Memory 512 may improve graphics processing performance. In another embodiment of Computing System 500 graphics processing performance is limited by computational resources, e.g., multipliers, adders, and the like, within Fragment Processing Pipeline 560. In that embodiment modifying logratio values to simplify texture filtering by reducing the number of texture samples filtered using anisotropic filtering may improve graphics processing performance. In various embodiments one or more programmed knob values may be used to control reduction of the number of texture samples used during anisotropic filtering, permitting a user to determine a balance between improved graphics processing performance and image quality.

Fragment Shader 555 outputs processed fragment data, e.g., color and depth, and codewords generated from shader program instructions to Raster Operations Unit 565. Raster Operations Unit 565 includes a read interface and a write interface to Memory Controller 520 through which Raster Operations Unit 565 accesses data stored in Local Memory 540 or Host Memory 512. Raster Operations Unit 565 optionally performs near and far plane clipping and raster operations, such as stencil, z test, blending, and the like, using the fragment data and pixel data stored in Local Memory 540 or Host Memory 512 at a pixel position (image location specified by x,y coordinates) associated with the processed fragment data. The output data from Raster Operations Unit 565 is written back to Local Memory 540 or Host Memory 512 at the pixel position associated with the output data and the results, e.g., image data are saved in graphics memory.

When processing is completed, an Output 585 of Graphics Subsystem 507 is provided using Output Controller 580. Alternatively, Host Processor 514 reads the image stored in Local Memory 540 through Memory Controller 520, Interface 517 and System Interface 515. Output Controller 580 is optionally configured by opcodes to deliver data to a display device, network, electronic control system, other Computing System 500, other Graphics Subsystem 507, or the like.

The invention has been described above with reference to specific embodiments. Persons skilled in the art will recognize, however, that various modifications and changes may be made thereto without departing from the broader spirit and scope of the invention as set forth in the appended claims. For example, in alternative embodiments, the footprint shortening technique set forth herein may be implemented either partially or entirely in a software program or a fragment program executed by Fragment Shader 555. The foregoing description and drawings are, accordingly, to be regarded in an illustrative rather than a restrictive sense. The listing of steps in method claims do not imply performing the steps in any particular order, unless explicitly stated in the claim.

The invention claimed is:

1. A computer readable medium storing instructions for causing a processor to shorten a footprint of a pixel in texture space in order to reduce a number of texture samples used during anisotropic filtering by performing the steps of:
   receiving a major axis length for the footprint of the pixel in texture space;
   receiving a minor axis length for the footprint of the pixel in texture space;
   computing a logratio value using the major axis length and the minor axis length; and
   modifying the logratio value based on a programmable value of a knob to produce a modified logratio corresponding to a shortened footprint of the pixel in texture space in order to reduce the number of texture samples used during anisotropic filtering.

2. The computer readable medium of claim 1, wherein the programmable value of the knob is used to reduce a first number of texture samples read from a texture map corresponding to LODfine.

3. The computer readable medium of claim 1, wherein the programmable value of the knob is used to reduce a second number of texture samples read from a texture map corresponding to LODcoarse.

4. The computer readable medium of claim 1, wherein the step of modifying includes combining the programmable value of the knob with a LODfrac that is a fractional portion of a base-two logarithm (log) of the minor axis length for the footprint of the pixel in texture space, to modify the logratio value.

5. The computer readable medium of claim 1, wherein the step of modifying includes determining a bias that is applied to the logratio value based on the programmable value of the knob.

6. The computer readable medium of claim 1, further comprising a step of determining a first number of texture samples to read from a texture map based on the modified logratio.

7. A computer readable medium storing instructions for causing a processor to reduce a number of texture samples read from a texture map corresponding to LODfine by performing the steps of:
   combining a programmable value of a knob with a LODfrac to compute a modified logratio value, wherein the LODfrac is a fractional portion of a base-two logarithm (log) of a minor axis length of a footprint of a pixel in texture space; and
   determining the number of texture samples read from the texture map corresponding to LODfine using the modified logratic value, wherein the number of texture samples corresponding to the modified logratio value is less than a number of texture samples corresponding to a logratio value that is computed as the base-two log of a ratio of a major axis length of the footprint of the pixel in texture space to the minor axis length of the footprint of the pixel in texture space.

8. The computer readable medium of claim 7, further comprising the step of modifying the modified logratio value by applying a bias to the modified logratio.

9. The computer readable medium of claim 8, wherein a second programmable knob is used to determine the bias.

10. The computer readable medium of claim 7, further comprising the step of clamping the modified logratio value.

11. A computer readable medium storing instructions for causing a processor to reduce a number of texture samples read from a texture map corresponding to LODcoarse by performing the steps of:
   combining a programmable value of a knob with a LODfrac to compute a modified logratio value, wherein the LODfrac is a fractional portion of a base-two logarithm (log) of a minor axis length of a footorint of a pixel in texture space; and
   determining the number of texture samples read from the texture map corresponding to LODcoarse using the modified logratio value, wherein the number of texture samples corresponding to the modified logratio value is less than a number of texture samples corresponding to a logratio value that is computed as the base-two log of a ratio of a maor axis length of the footprint of the pixel in texture space to the minor axis length of the footprint of the pixel in texture space.

12. The computer readable medium of claim 11, further comprising the step of increasing the modified logratio value based on the LODfrac when a second knob is not equal to zero.

13. The computer readable medium of claim 11, further comprising the step of modifying the modified logratio value by applying a bias to the modified logratio.

14. The computer readable medium of claim 13, wherein a second programmable knob is used to determine the bias.

15. The computer readable medium of claim 11, further comprising the step of clamping the modified logratio value.

* * * * *

UNITED STATES PATENT AND TRADEMARK OFFICE
CERTIFICATE OF CORRECTION

| | |
|---|---|
| PATENT NO. | : 7,221,371 B2 |
| APPLICATION NO. | : 10/812492 |
| DATED | : May 22, 2007 |
| INVENTOR(S) | : Donovan et al. |

It is certified that error appears in the above-identified patent and that said Letters Patent is hereby corrected as shown below:

In column 12, line 30, please replace "logratic", with --logratio--

In column 12, line 59, please replace "maor", with --major--

Signed and Sealed this

Fifteenth Day of April, 2008

JON W. DUDAS
*Director of the United States Patent and Trademark Office*